(No Model.)

G. GUILLEMIN.
PIPE AND HOSE COUPLING.

No. 344,312. Patented June 22, 1886.

Witnesses:
David S. Williams
John S. Parker

Inventor:
Georges Guillemin
by his Attorneys
Howson & Sons

N. PETERS, Photo-Lithographer, Washington, D. C.

UNITED STATES PATENT OFFICE.

GEORGES GUILLEMIN, OF PARIS, FRANCE.

PIPE AND HOSE COUPLING.

SPECIFICATION forming part of Letters Patent No. 344,312, dated June 22, 1886.

Application filed August 4, 1885. Serial No. 173,519. (No model.) Patented in France March 5, 1885, No. 167,444, and in Belgium July 15, 1885, No. 69,598.

*To all whom it may concern:*

Be it known that I, GEORGES GUILLEMIN, a citizen of the Republic of France, and residing in Paris, France, have invented an Improved Pipe-Coupling, (for which I have obtained French Patent No. 167,444, dated March 5, 1885, and Belgian Patent No. 69,598, dated July 15, 1885,) of which the following is a specification.

My invention relates to that class of couplings which are more especially adapted for use for hose and other flexible pipes, and which it is desired to couple and uncouple very quickly.

The object of my invention is to so construct the coupling that the screw-threads of the coupling will at all times be protected from injury from accidental blows, and from the access of dust and dirt thereto, and this object I attain as hereinafter described.

Figure 1:
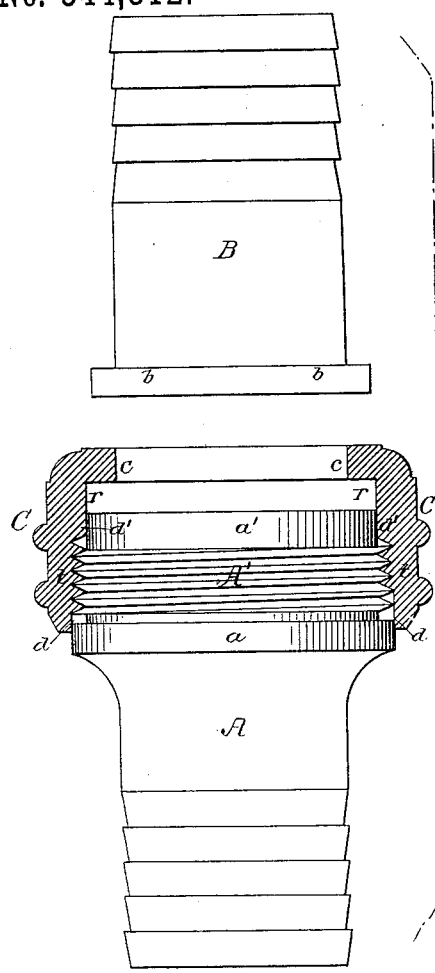
Figure 4:
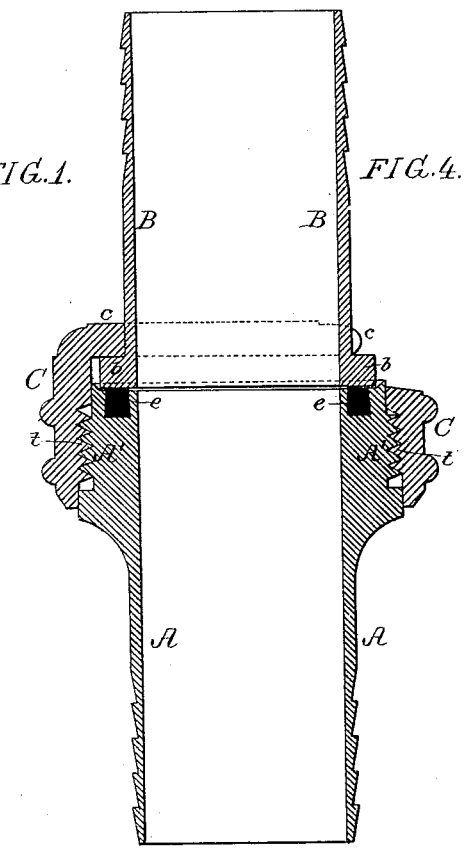
Figure 2:
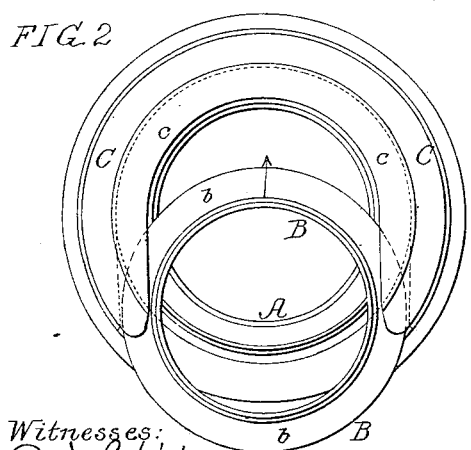
Figure 3:
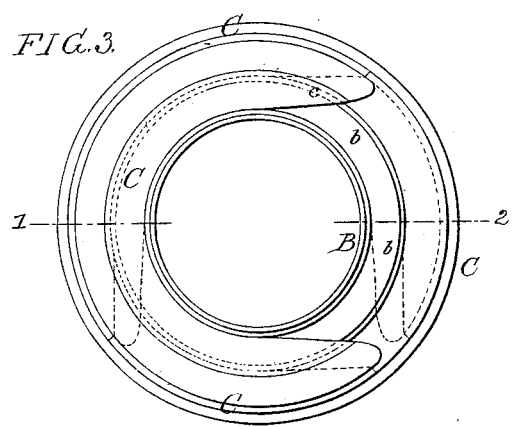

In the accompanying drawings, Figure 1 is a side view of the two parts of the coupling detached, with the flanged screw-nut in section. Fig. 2 is a plan or end view showing the two parts about to be united. Fig. 3 is a corresponding view of the parts united; and Fig. 4 is a sectional view on the line 1 2, Fig. 3.

A and B are the two metal pipe ends to be united, and to which the ends of the sections of hose or other piping are bound by wire or other ligature in the ordinary manner.

The pipe end A is provided with a threaded portion, A', to which is screwed the threaded portion $t$ of the flanged coupling-nut C. This coupling-nut is provided with a flange, $c$, forming within the latter a recess, $r$, of a size sufficient to receive the flange $b$ of the pipe end B, which flange engages with the under side of the flange $c$ of the nut. This flange $c$ and the recess $r$ are open at one side, as shown in Figs. 2, 3, and 4, so as to permit of the insertion of the flanged end of the pipe B within the nut sidewise, as illustrated in Fig. 2, when the nut is sufficiently unscrewed from the pipe end A for the purpose.

The extreme end of the pipe A is provided with an annular groove, into which is set a rubber or other suitable packing, $e$, against which the end of the pipe B abuts to make a tight joint when the nut C is screwed down.

To permit the pipe end B to be detached it is only necessary to give the nut C one or two turns, when the flanged end of the pipe may be withdrawn laterally, and under ordinary circumstances the nut C is never detached from the pipe end A.

In order to protect the threads A' and $t$ from injury from accidental blows as the coupling is thrown about, and to prevent dust and dirt from getting access thereto to grind away the threads, I provide the pipe end A with a cylindrical portion $a$, behind the threads A', which cylindrical portion $a$ is adapted to a corresponding cylindrical seat, $d$, in the nut C, and at the outer end of the pipe A, in front of the threads A', I provide another cylindrical portion, $a'$, which is adapted to a corresponding cylindrical seat, $d'$, in the nut C below its flange $c$. These cylindrical portions $a$ and $a'$ on each side of the threads form joints to exclude dust and dirt, and protect the exposure of the threads, more particularly on the pipe end A, from exposure to injury from accidental blows.

I claim as my invention—

The combination of the flanged pipe end B and a flanged threaded nut, C, open at the side, with a pipe end, A, having a threaded portion, and cylindrical portions $a$ and $a'$ on opposite sides of the threads and adapted to seats in the nut, substantially as and for the purpose set forth.

In testimony whereof I have signed my name to this specification in the presence of two subscribing witnesses.

GEORGES GUILLEMIN.

Witnesses:
 JOSEPH DELAGE,
 ROBT. M. HOOPER.